(12) United States Patent
Kudo et al.

(10) Patent No.: US 7,843,701 B2
(45) Date of Patent: Nov. 30, 2010

(54) ELECTRONIC COMPONENT AND ELECTRONIC-COMPONENT PRODUCTION METHOD

(75) Inventors: Kazuhide Kudo, Sagamihara (JP); Minoru Matsunaga, Echizen (JP); Katsuji Matsuta, Yokohama (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 818 days.

(21) Appl. No.: 11/773,003

(22) Filed: Jul. 3, 2007

(65) Prior Publication Data
US 2008/0130258 A1 Jun. 5, 2008

Related U.S. Application Data

(63) Continuation of application No. PCT/JP2005/021659, filed on Nov. 25, 2005.

(30) Foreign Application Priority Data

Jan. 7, 2005 (JP) ............................. 2005-002115

(51) Int. Cl.
*H05K 7/02* (2006.01)
*H05K 7/06* (2006.01)
*H05K 7/08* (2006.01)
*H05K 7/10* (2006.01)

(52) U.S. Cl. .................. 361/760; 361/761; 361/762; 361/306.3; 336/200

(58) Field of Classification Search ......... 361/760–763, 361/784–785, 306.1–306.3; 336/199–200
See application file for complete search history.

(56) References Cited

U.S. PATENT DOCUMENTS

| | | | |
|---|---|---|---|
| 5,955,931 A * | 9/1999 | Kaneko et al. ............ 333/175 |
| 6,194,248 B1 * | 2/2001 | Amaya et al. ............ 438/110 |
| 6,597,270 B2 * | 7/2003 | Takashima et al. .......... 336/83 |
| 6,713,162 B2 * | 3/2004 | Takaya et al. ............. 428/209 |
| 6,727,782 B2 | 4/2004 | Sasaki et al. |

FOREIGN PATENT DOCUMENTS

| | | |
|---|---|---|
| JP | 07-029737 | 1/1995 |
| JP | 07-201636 | 8/1995 |
| JP | 8-83734 | 3/1996 |

(Continued)

OTHER PUBLICATIONS

PCT/JP2005/021659, Written Opinion dated Feb. 14, 2006.

(Continued)

*Primary Examiner*—Tuan T Dinh
(74) *Attorney, Agent, or Firm*—Dickstein Shapiro LLP

(57) ABSTRACT

An electronic component and an electronic-component production method in which the magnitude of a stray capacitance produced between adjacent outer electrodes is controllable. The electronic component includes a chip body and first to fourth outer electrodes. In the chip body, first and second coil block are sandwiched between magnetic substrates. Dielectric layers are interposed between the outer electrodes and the chip body such as to be away from exposed portions of coil patterns in the coil blocks. The dielectric layers have a width larger than a width of the outer electrodes, and a dielectric constant of the dielectric layers is set to be lower than the dielectric constant of the magnetic substrates.

11 Claims, 8 Drawing Sheets

FOREIGN PATENT DOCUMENTS

| | | |
|---|---|---|
| JP | 09-246046 | 9/1997 |
| JP | 2000-277335 | 6/2000 |
| JP | 2000-331831 | 11/2000 |
| JP | 2001-23865 | 1/2001 |
| WO | WO 2006/073029 | 7/2006 |

OTHER PUBLICATIONS

PCT/JP2005/021659, International Search Report dated Feb. 14, 2006.

* cited by examiner

US 7,843,701 B2

ELECTRONIC COMPONENT AND ELECTRONIC-COMPONENT PRODUCTION METHOD

CROSS REFERENCE TO RELATED APPLICATIONS

The present application is a continuation of International Application No. PCT/JP2005/021659, filed Nov. 25, 2005, which claims priority to Japanese Patent Application No. JP2005-002115, filed Jan. 7, 2005, the entire contents of each of these applications being incorporated herein by reference in their entirety.

FIELD OF THE INVENTION

The present invention relates to an electronic component that can be mounted on an electrical circuit required to have a smaller size and a higher density, and to a production method for the electronic component.

BACKGROUND OF THE INVENTION

As this type of electronic component, a chip-type common-mode choke coil is disclosed, for example, in Patent Document 1. A common-mode choke coil is mounted to eliminate noise from a high-speed differential transmission line, and serves to efficiently transmit a differential signal in a normal mode and to eliminate invading noise in a common mode.

With recent size reduction and increases in density of electronic circuits, there has been a demand to minimize this chip-type common mode choke coil. However, minimization of the electronic component forcibly reduces the distance between outer electrodes, and this causes a stray capacitance between the outer electrodes. This stray capacitance may cause mismatching of the characteristic impedance near the outer electrodes. Mismatching of the characteristic impedance not only deteriorates the differential-signal transmission characteristic in a normal mode, but also changes the differential signal to common-mode noise. In order to overcome these problems, it is conceivable to reduce the width of the outer electrodes themselves. However, this reduces the fixing strength of the outer electrodes to a substrate.

For example, Patent Document 2 discloses a technique of suppressing a stray capacitance produced between outer electrodes by placing dielectric materials having a low dielectric constant under the outer electrodes. It is conceivable to apply this technique to an electronic component, such as a common-mode choke coil, in which a plurality of outer electrodes are adjacent at an end of a chip body.

Patent Document 1: Japanese Unexamined Patent Application Publication No. 2000-277335

Patent Document 2: Japanese Unexamined Patent Application Publication No. H08-083734

Unfortunately, when the above-described technique disclosed in Patent Document 2 is applied to an electronic component such as a common-mode choke coil, the following problem is caused.

FIG. 14 is a schematic partial sectional view explaining the problem of the conventional art.

Through the use of the above-described technique, an effect of suppressing a stray capacitance is sufficiently achieved between opposing outer electrodes provided at both ends of a chip body. However, in this technique, low-constant dielectrics 111 and 112 are juxtaposed at one end of a chip body 100 having a high dielectric constant, and outer electrodes 101 and 102 are provided such as to cover the low-constant dielectrics 111 and 112, respectively, as shown in FIG. 14. For this reason, peripheral edge portions 101a and 102a of the low-constant dielectrics 111 and 112 are in contact with the chip body 100 having a high dielectric constant. Consequently, a capacitor is formed in which the peripheral edge portions 101a and 102a adjacent across the chip body 100 having a high dielectric constant serve as electrodes. As shown by broken lines in FIG. 14, a large stray capacitance C corresponding to the dielectric constant of the chip body 100 is produced between the peripheral edge portions 101a and 102a.

SUMMARY OF THE INVENTION

The present invention has been made to overcome the above-described problem, and an object of the invention is to provide an electronic component and an electronic-component production method in which the magnitude of a stray capacitance produced between adjacent outer electrodes is controllable.

In order to overcome the above-described problem, the present invention provides an electronic component including a chip body including circuit blocks sandwiched between a pair of substrate elements; and a plurality of substantially angular U-shaped outer electrodes extending from a surface of one of the substrate elements to a surface of the other substrate element while being connected to end portions of circuit patterns provided in the circuit blocks, the end portions being exposed from the circuit blocks. A dielectric layer having a predetermined dielectric constant is interposed between the outer electrodes and the chip body such as to be away from the exposed end portions of the circuit patterns. The width of the dielectric layer is set to be greater than or equal to the width of each of the outer electrodes so that the outer electrodes do not protrude from the dielectric layer. A groove is provided on a surface of the substrate element on which the dielectric layer is provided, and near the exposed end portion of the circuit pattern, and the length of the groove is greater than or equal to the width of the exposed end portion.

With this configuration, the dielectric layer is interposed between the outer electrodes and the chip body, and the outer electrodes do not protrude from the dielectric layer. Therefore, the magnitude of a stray capacitance produced between the outer electrodes during use of the electronic component corresponds to the dielectric constant of the dielectric layer.

The dielectric constant of the dielectric layer is preferably set to be lower than the dielectric constant of the substrate elements.

In this case, it is possible to suppress the stray capacitance produced between adjacent outer electrodes, and to prevent the characteristic impedance from decreasing near the outer electrodes.

According to an aspect of the present invention, the dielectric layer is split corresponding to the outer electrodes so as to form an air space between the adjacent outer electrodes.

In this case, since the air space having the lowest dielectric constant lies between the outer electrodes, a stray capacitance produced between the adjacent outer electrodes can be suppressed further.

According to another aspect of the present invention, the dielectric constant of the dielectric layer is set to be greater than or equal to the dielectric constant of the substrate elements.

In this case, it is possible to increase the stray capacitance produced between the adjacent outer electrodes, and to reduce the characteristic impedance near the outer electrodes to a desired value.

According to yet another aspect of the present invention, a portion of the dielectric layer lies between the adjacent outer electrodes.

In this case, the dielectric layer having a dielectric constant greater than or equal to the dielectric constant of the substrate elements lies between the adjacent outer electrodes. Therefore, the characteristic impedance can be reduced to a lower level.

According to the present invention, the electronic component is a common-mode choke coil, and includes first and second coil blocks stacked and serving as the circuit blocks respectively having coil patterns as the circuit patterns; a pair of magnetic substrates serving as the pair of substrate elements; first and second outer electrodes connected to both ends of the coil pattern provided in the first coil block; and third and fourth outer electrodes connected to both ends of the coil pattern provided in the second coil block.

The electronic-component production method includes a first step of forming the chip body; a second step of forming the groove on the surface of the substrate element on which the dielectric layer is to be formed, and near the exposed end portion of the circuit pattern, the groove having a length larger than or equal to the width of the exposed end portion; a third step of forming the dielectric layer by applying a dielectric paste having a predetermined viscosity on the surface of one of the substrate elements and the surface of the other substrate element in a state in which at least the exposed end portions of the circuit patterns are covered; and a fourth step of forming the outer electrodes on the dielectric layer.

In this method, the chip body is formed in the first step, and the groove having a length larger than or equal to the width of the exposed end portion of the circuit patterns is formed near the exposed end portion in the second step. In the third step, a dielectric paste having a predetermined viscosity is applied on the surface of one of the substrate elements and the surface of the other substrate element in a state in which at least the exposed end portions are covered. In this case, the dielectric paste may spread so as to reach and cover the exposed end portion of the circuit pattern, and may cause connection failure with the outer electrode. However, since the groove is formed near the exposed end portion of the circuit pattern in the second step of the electronic-component production method according to the present invention, the dielectric paste does not spread toward the exposed end portion, but is stored in the groove. Moreover, since the dielectric paste is drawn in the groove by surface tension thereof, it does not leak out of the groove. In the fourth step, the outer electrodes are formed on the dielectric layer.

In the electronic-component production method, the width of the groove is set to be ½ to ⅓ times of the thickness of the substrate elements.

According to the electronic-component production method, a pair of grooves are formed so that the exposed end portions of the circuit pattern are provided therebetween.

In this case, the dielectric paste is completely prevented by the pair of grooves from reaching the exposed end portions.

As described in detail above, according to the electronic component of the present invention, the magnitude of the stray capacitance produced between the outer electrodes during use of the electronic component corresponds to the dielectric constant of the dielectric layer. Therefore, the magnitude of the stray capacitance produced between the adjacent outer electrodes can be freely controlled by the dielectric constant of the dielectric layer, correspondingly to minimization of the component.

In particular, the stray capacitance produced between the outer electrodes is suppressed, and the characteristic impedance is prevented from decreasing near the outer electrodes. Therefore, noise is prevented from being caused by the decrease in the characteristic impedance. As a result, a normal operating characteristic can be ensured. Further, the stray capacitance produced between the outer electrodes can be suppressed further, and therefore, the operating characteristic of the electronic component can be improved further.

In the electronic component according to the present invention, the characteristic impedance near the outer electrodes can be reduced to a desired value. This is considerably convenient.

In the electronic-component production method, the groove is formed near the exposed end portion of the circuit pattern in the second step so as to prevent the dielectric paste from extending to the exposed end portion in the third step. Therefore, it is possible to produce a high-performance electronic component in which connection failure between the outer electrodes and the circuit patterns is avoided.

REFERENCE NUMERALS

1: electronic component, 2: chip body, 3: first coil block, 4: second coil block, 5, 6: magnetic substrate, 5a, 6a: surface, 5b, 6b: side face, 7-1 to 7-4: outer electrode, 8, 8': dielectric layer, 9: groove, 33, 41: coil pattern, 33a1, 33c1, 41b1, 41a1: leading end, 81: lower dielectric layer portion, 82: upper dielectric layer portion, B: gap, C: stray capacitance, T: thickness, W7, W8, d1, d2: width.

DETAILED DESCRIPTION OF THE INVENTION

The best mode of the present invention will be described below with reference to the drawings.

First Embodiment

Figure 1:
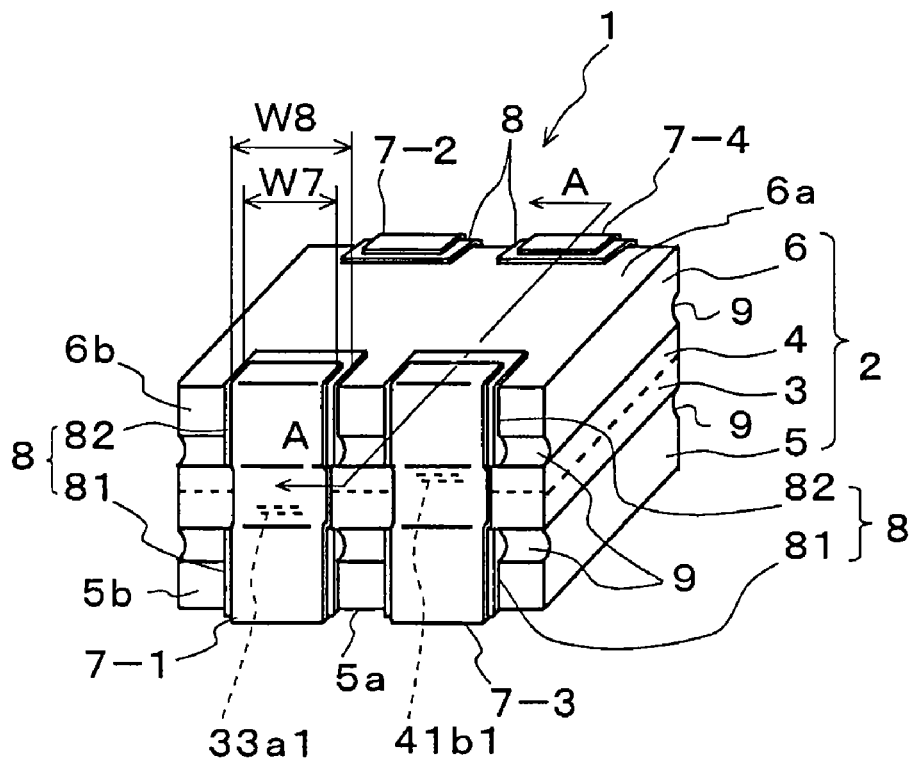
FIG. 1 is an outside view of an electronic component according to a first embodiment of the present invention.
Figure 2:
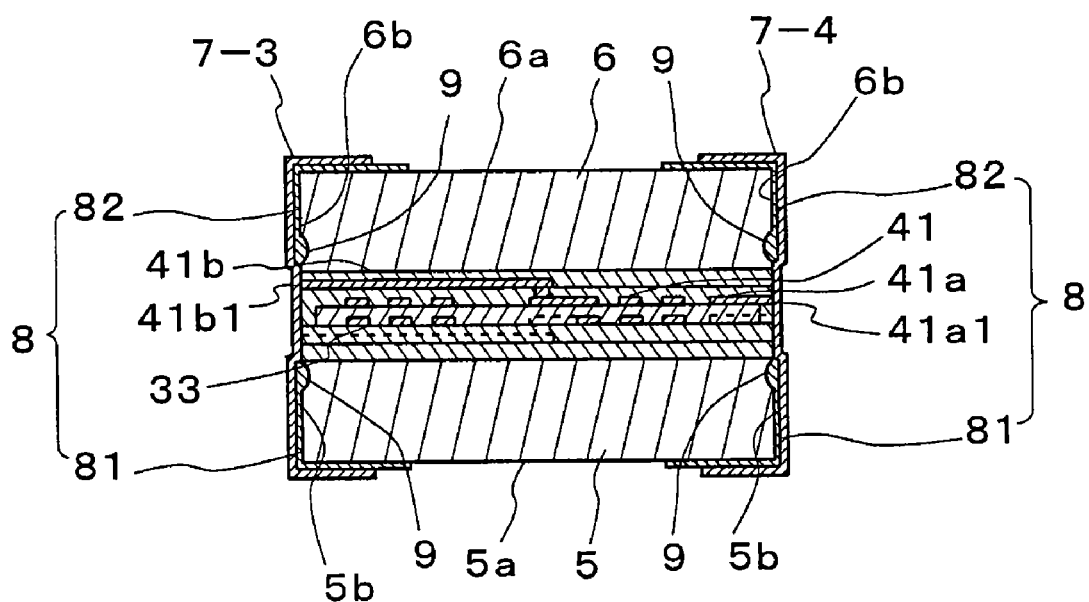
FIG. 2 is a cross-sectional view, as viewed from the directions of arrows A-A in FIG. 1.
Figure 3:
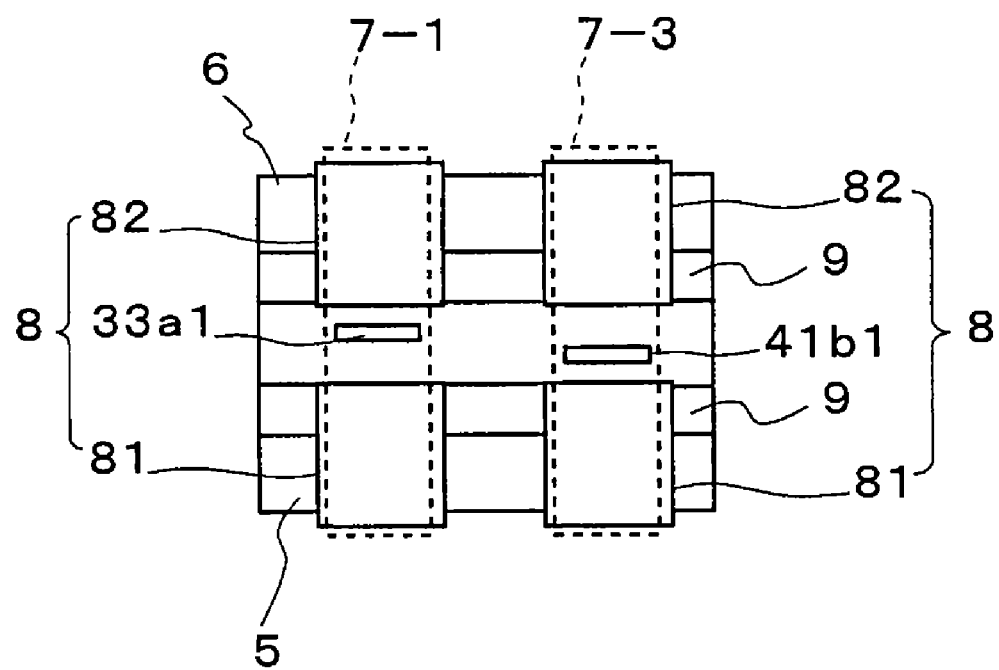
FIG. 3 is a front view of the electronic component, showing exposed portions of coil patterns.
Figure 4:
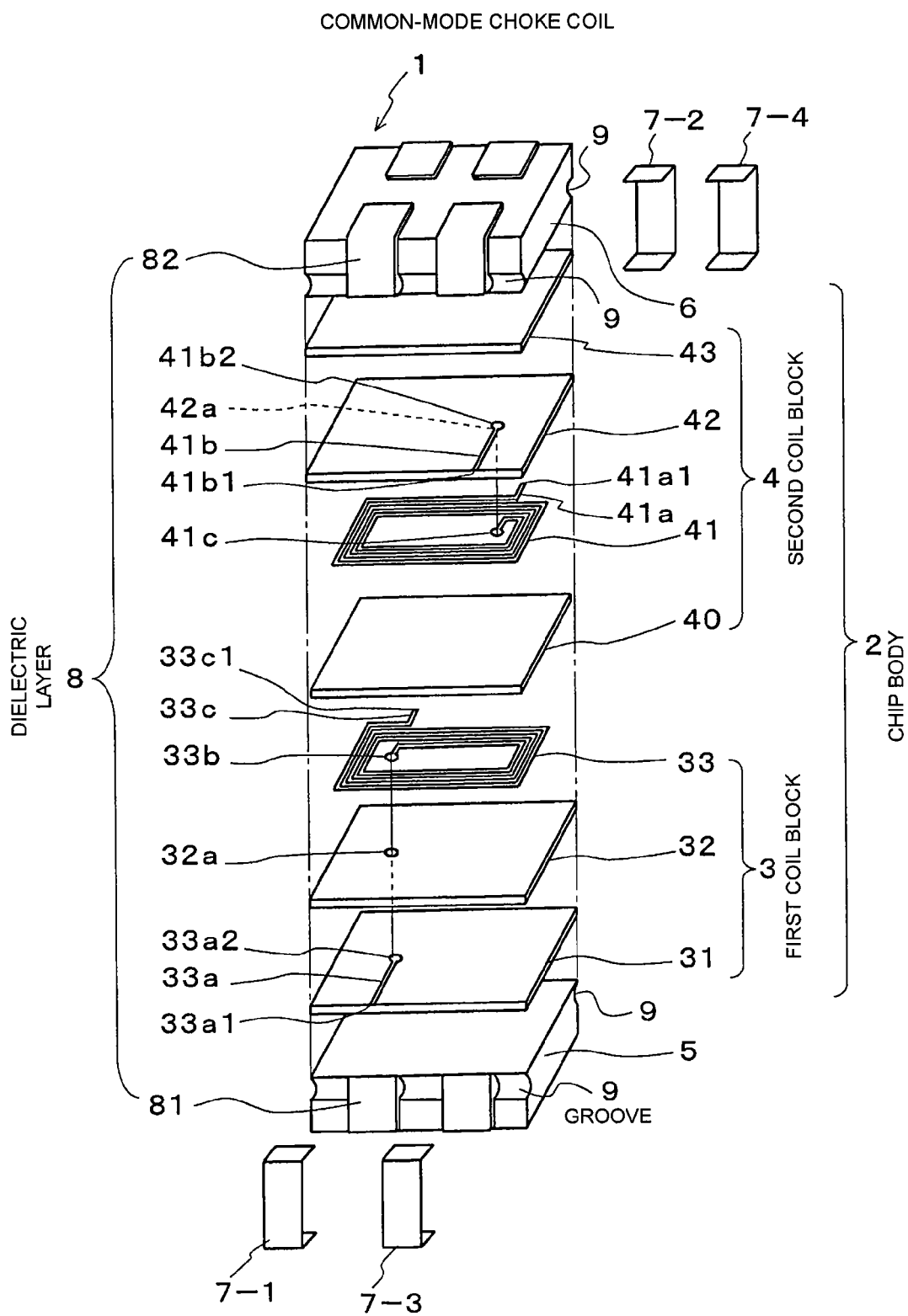
FIG. 4 is an exploded perspective view of the electronic component.

FIG. 1 is an outside view of an electronic component according to a first embodiment of the present invention, FIG. 2 is a cross-sectional view, as viewed from the directions of arrows A-A in FIG. 1, FIG. 3 is a front view of the electronic component, showing exposed portions of coil patterns, and FIG. 4 is an exploded perspective view of the electronic component.

An electronic component 1 according to this embodiment is a common-mode choke coil, and includes a chip body 2 and first to fourth outer electrodes 7-1 to 7-4, as shown in FIGS. 1 and 3.

In the chip body 2, first and second coil blocks 3 and 4 serving as circuit blocks are sandwiched between magnetic substrates 5 and 6 serving as substrate elements from above and below.

As shown in FIG. 4, the first block 3 includes insulating layers 31 and 32 and a coil pattern 33 that are stacked on the magnetic substrate 5.

More specifically, the insulating layer 31 is placed on the magnetic substrate 5, and one end portion 33a of the coil pattern 33 is provided on the insulating layer 31. A leading end 33a1 of the end portion 33a reaches an edge of the insulating layer 3l, and is exposed from the first coil block 3. The insulating layer 32 having a via hole 32a is placed on the insulating layer 31 and the end portion 33a, and the coil pattern 33 is provided on the insulating layer 32. A leading end 33c1 of the other end portion 33c of the coil pattern 33 reaches an edge of the insulating layer 32, and is exposed from the first coil block 3. An inner end portion 33b of the coil pattern 33 is electrically connected to a rear end 33a2 of the end portion 33a via the via hole 32a provided in the insulating layer 32.

This coil pattern 33 is a planar and spiral coil pattern. The entire coil pattern 33 except the end portion 33a is patterned on a surface of the insulating layer 32.

On the other hand, the second coil block 4 includes a coil pattern 41 and insulating layers 40, 42, and 43 that are stacked on the first coil block 3.

More specifically, the insulating layer 40 is placed on the coil pattern 33 of the first coil block 3, and the coil pattern 41 is provided on the insulating layer 40. A leading end 41a1 of a one-end portion 41a of the coil pattern 41 reaches an edge of the insulating layer 40, and is exposed from the second coil block 4. The insulating layer 42 having a via hole 42a is placed on the coil pattern 41, and an other-end portion 41b of the coil pattern 41 is provided on the insulating layer 42. A leading end 41b1 of the other-end portion 41 breaches an edge of the insulating layer 42, and is exposed from the second coil block 4. An inner end portion 41c of the coil pattern 41 is electrically connected to a rear end 41b2 of the other-end portion 41b via the via hole 42a.

This coil pattern 41 is a planar and spiral coil pattern, similarly to the coil pattern 33. The entire coil pattern 4l except the other-end portion 41b is patterned on a surface of the insulating layer 40.

The insulating layer 43 is further stacked so as to cover the other-end portion 41b of the coil pattern 41, and the magnetic substrate 6 is bonded onto the insulating layer 43 with an unillustrated adhesive.

In FIGS. 1 to 4, reference numeral 9 denotes grooves.

These grooves 9 serve to prevent dielectric layers 8 from protruding toward the first coil block 3 and the second coil block 4 such as to cover the exposed leading ends 33a1, 33c1, 41b1, and 41a1 of the coil patterns 33 and 41 during production that will be described below. Although will be described in detail in the following description of a second step of a production method for the electronic component 1, the grooves 9 are respectively provided in side faces 5b and 6b of the magnetic substrates 5 and 6 on which the dielectric layers 8 are provided, and the upper and lower grooves 9 and 9 are located near the exposed leading ends 33a1 (33c1) and 41b1 (41a1), as shown in FIG. 2. The length of the grooves 9 is set to be larger than or equal to the width of the exposed leading ends 33a1 (33c1, 41b1, 41a1).

The chip body 2 has the above-described structure, and the first to fourth outer electrodes 7-1 to 7-4 are provided outside the chip body 2, as shown in FIG. 1.

More specifically, as shown in FIGS. 1 to 3, the first outer electrode 7-1 is connected to the exposed leading end 33a1 of the one-end portion 33a of the coil pattern 33, and the second outer electrode 7-2 is connected to the exposed leading end 33c1 of the coil pattern 33. This allows a differential signal and soon to be applied to the coil pattern 33 when mounted. The third outer electrode 7-3 is connected to the exposed leading end 41b1 of the other-end portion 41b of the coil pattern 41, and the fourth outer electrode 7-4 is connected to the exposed leading end 41a1 of the coil pattern 41. This allows a differential signal and so on to be applied to the coil pattern 41 when mounted.

The outer electrodes 7-1 to 7-4 connected to the coil patterns 33 and 41 in the above-described manner extend from a surface 6a of the upper magnetic substrate 6 to a surface 5a of the lower magnetic substrate 5, and have a substantially angular U-shaped outline, as shown in FIG. 2.

However, in the electronic component according to this embodiment, the outer electrodes 7-1 (7-2 to 7-4) are not indirect contact with the chip body 2. That is, the dielectric layers 8 are provided outside the chip body 2, and the outer electrodes 7-1 (7-2 to 7-4) are provided on the dielectric layers 8.

More specifically, the dielectric layers 8 are separate corresponding to the outer electrodes 7-1 (7-2 to 7-4). For example, in FIG. 1, the dielectric layer 8 corresponding to the outer electrode 7-1 is separate from the adjacent dielectric layer 8 corresponding to the outer electrode 7-3. An airspace is thereby formed between the outer electrodes 7-1 and 7-3.

Each of the dielectric layers 8 includes a lower dielectric layer portion 81 and an upper dielectric layer portion 82, so that the dielectric layers 8 are respectively interposed between the outer electrodes 7-1 (7-2 to 7-4) and the chip body 2 in a manner such as to be out of contact with the exposed portions 33a1, 33c1, 41a1, and 41b1 of the coil patterns 33 and 41. That is, as shown in FIG. 2, the lower dielectric layer portion 81 of each dielectric layer 8 is L-shaped, and is attached on the surface 5a and a side face 5b of the magnetic substrate 5. The upper dielectric layer portion 82 is also L-shaped, and is attached on the surface 6a and a side face 6b of the magnetic substrate 6. Therefore, as shown in FIG. 3, the dielectric layers 8 do not cover the leading ends 33a1 (33c1) and 41b1 (41a1) of the coil patterns 33 and 41, only the centers of the outer electrodes 7-1 and 7-3 (7-2 and 7-4) are connected such as to cover the leading ends 33a1 (33c1) and 41b1 (41a1).

As shown in FIG. 1, the width of the dielectric layer 8, that is, the width W8 of the lower dielectric layer portion 81 and the upper dielectric layer portion 82 is set to be larger than the width W7 of the outer electrodes 7-1 to 7-4 so that the outer electrodes 7-1 (7-2 to 7-4) do not protrude from the dielectric layers 8. The dielectric constant of the dielectric layers 8 is set to be lower than the dielectric constant of the magnetic substrates 5 and 6.

A description will now be given of the materials of the parts that constitute the electronic component 1 according to this embodiment.

The magnetic substrates 5 and 6 are formed of a ferrite having a dielectric constant (relative dielectric constant) of 10 to 15. While the insulating layers 31 and 32 and the insulating layers 40, 42, and 43 of the first and second coil blocks 3 and 4 are formed of a polyimide resin having a dielectric constant of 3.2, they may be formed of resins such as epoxy resin and benzocyclobutene resin, glass such as $SiO_2$, or glass ceramics. The coil patterns 33 and 33a and the coil patterns 41 and 41b are formed of Ag. Of course, the coil patterns may be formed of metals such as Pb, Cu, and Al, or an alloy of these metals. The adhesive for bonding the magnetic substrate 6 is formed of a thermosetting polyimide resin. While the outer electrodes 7-1 to 7-4 are obtained by forming a Ni film on an Ag film, they may be obtained by forming a metal film, such as Sn or Sn—Pb, on a metal film containing Ab-Pd, Cu, NiCr, or NiCu.

The dielectric layers 8 are formed of a polyimide resin having a dielectric constant of 3.2, similarly to the insulating layers 31 and so on, and the dielectric constant thereof is lower than that of the magnetic substrates 5 and 6. Of course, resins having a dielectric constant of approximately 3.2, such as epoxy resin and benzocyclobutene resin, glass such as SiO2, or glass ceramics may be adopted.

Next, a production method for the electronic component 1 according to this embodiment will be described. This production method concretely embodies the electronic-component production method according to the present invention.

The production method according to this embodiment includes four steps, that is, first to fourth steps.

First the first step is performed. In the first step, the chip body 2 is formed. As shown in FIG. 4, the insulating layers 31, 32, 40, 42, and 43 and the coil patterns 33, 33a, 41, 41b are sequentially stacked on the magnetic substrate 5 by photolithography, and the magnetic substrate 6 is then bonded on the second coil block 4 by heating, pressing, and cooling, so that the chip body 2 is formed. Since this step is a known technique, a detailed description thereof is omitted.

Subsequently, the second step is performed. In the second step, grooves are formed.

Figure 5:
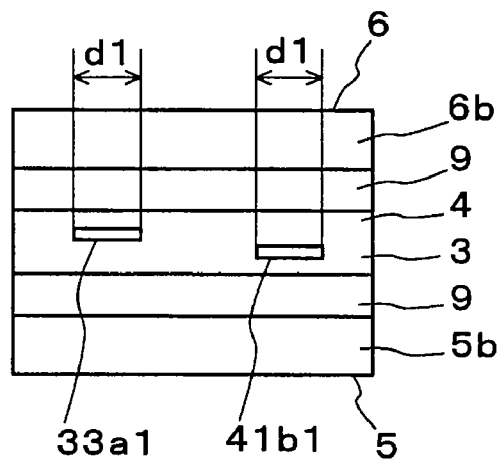
FIG. 5 is a front view of a chip body, explaining a second step.
Figure 6:
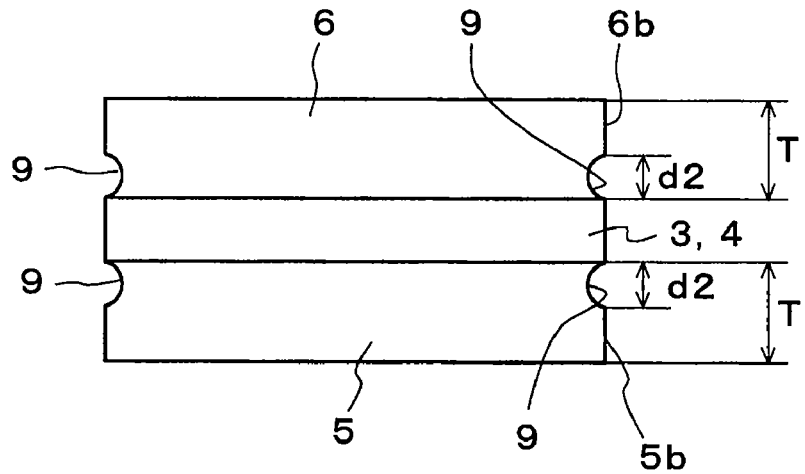
FIG. 6 is a side view of the chip body.

FIG. 5 is a front view of the chip body, explaining the second step, and FIG. 6 is a side view of the chip body.

As shown in FIGS. 5 and 6, a pair of grooves 9 and 9 are formed so that the exposed portions of the coil patterns 33 and 41, that is, the leading ends 33a1 (33c1) and 41b1 (41a1) are provided therebetween.

More specifically, one of the grooves 9 is formed in an upper part of a side face Sb of the magnetic substrate 5 and the other groove 9 is formed in a lower part of a side face 6b of the magnetic substrate 6 so that these grooves 9 and 9 are provided near the leading ends 33a1 (33c1) and 41b1 (41a1). The length of the grooves 9 and 9 is set to be larger than or equal to the width dl of the leading ends 33a1 (33c1) and 41b1 (41a1). In this embodiment, as shown in FIG. 5, the length of the grooves 9 and 9 is set to be equal to the total width of the side faces 5b and 6b of the magnetic substrates S and 6. The groove width d2 of the grooves 9 is set to be ½ to ⅓ times of the thickness T of the magnetic substrates 5 and 6, as shown in FIG. 6. These grooves 9 can be formed by a known method such as sand blasting or a cutting method using a laser or the like.

Then, the third step is performed. In the third step, the dielectric layers 8 are formed.

Figure 7:
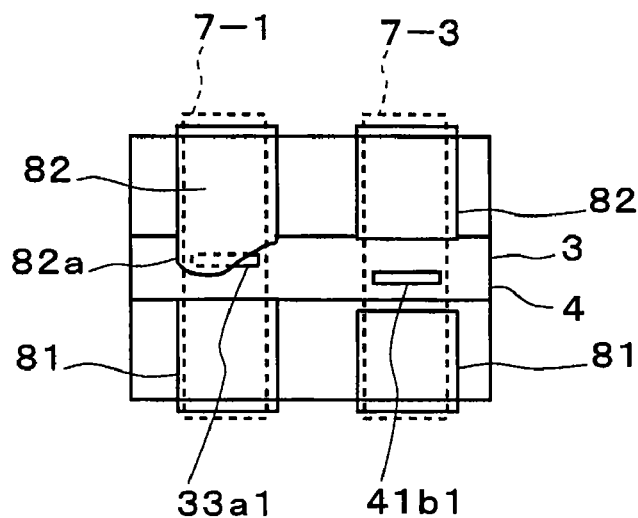
FIG. 7 is a front view of defective dielectric layers.
Figure 8:
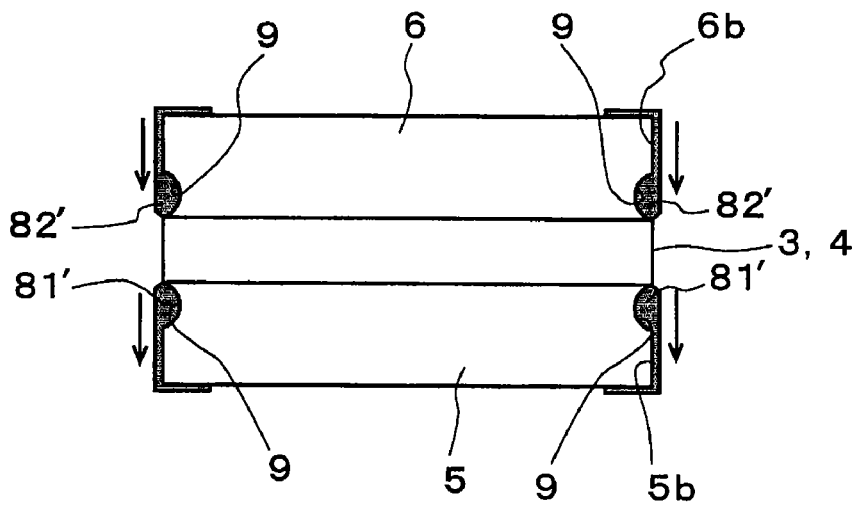
FIG. 8 is a side view of the chip body that has been subjected to a third step.

FIG. 7 is a front view showing defective dielectric layers, and FIG. 8 is a side view of the chip body which has been subjected to the third step.

In the third step, in a state in which the face from which the leading ends 33a1 (33c1) and 41b1 (41a1) of the coil patterns 33 and 4l are exposed is covered with a mask or a screen, a dielectric paste having a predetermined viscosity is applied from the surface 6a of the magnetic substrate 6 to the surface 5a of the magnetic substrate 5, for example, by rolling or screen printing. In this case, if the side faces 5b and 6b of the magnetic substrates 5 and 6 are flat, for example, as shown in FIG. 7, an upper dielectric paste for forming the upper dielectric layer portion 82 spreads downward more than necessary, and an extended portion 82a of the upper dielectric layer portion 82 covers the leading end 33a1, and this may cause connection failure between the outer electrode 7-1 and the coil pattern 33. Further, a lower dielectric paste is contracted downward, and for example, there is a possibility that a sufficiently large lower dielectric layer portion 81 cannot be formed under the outer electrode 7-3.

In this embodiment, however, the grooves 9 and 9 are formed on the side faces 5b and 6b of the magnetic substrates 5 and 6 in the second step so that these grooves 9 and 9 are located near the leading ends 33a1 (33c1) and 41b1 (41a1), as described above. Therefore, excess dielectric paste is stored in the grooves 9 and 9. For example, when the dielectric paste is applied from top to bottom of the chip body 2, as shown by the arrows in FIG. 8, a dielectric paste 82' on the magnetic substrate 6 attempts to spread from the side face 6b of the magnetic substrate 6 toward the first and second coil blocks 3 and 4, but an excess part of the dielectric paste 82' falls into the grooves 9. Moreover, since the dielectric paste 82' is drawn into the grooves 9 by surface tension thereof, it does not leak from the grooves 9, and does not cover the leading ends 33a1 (33c1) and 41b1 (41a1) of the coil patterns 33 and 41. On the other hand, a dielectric paste 81' on the magnetic substrate 5 attempts to contract toward the lower part of the side face 5b of the magnetic substrate 5. However, since the dielectric paste 81' entering the grooves 9 counters the contracting force, it does not contract, and is applied in a desired size.

Finally, the fourth step is performed. In the fourth step, the outer electrodes 7-1 to 7-4 are formed on the dielectric layers 8 formed in the third step.

That is, a conductive paste containing Ag is applied onto portions where the outer electrodes 7-1 to 7-4 to be formed, or Ag films are formed, for example, by sputtering or vapor deposition. By further forming Ni metal films on the Ag films by wet electrolytic plating, the outer electrodes 7-1 to 7-4 are formed.

Next, the operation and advantages of the electronic component according to this embodiment will be described.

Figure 9:
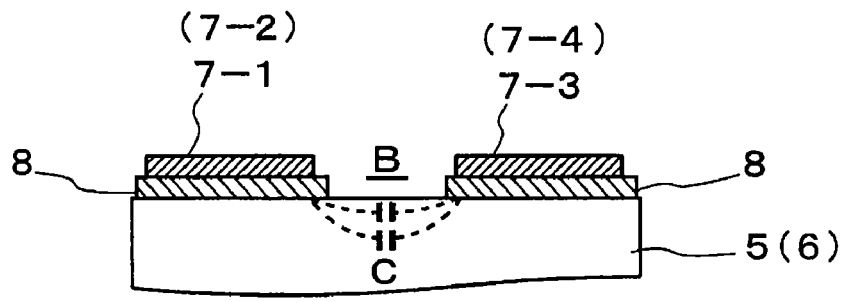
FIG. 9 is a schematic partial sectional view explaining the operation and advantages of the electronic component.

FIG. 9 is a schematic partial sectional view explaining the operation and advantages of the electronic component.

In FIG. 1, when the outer electrodes 7-1 to 7-4 are connected to an unillustrated transmission line, the electronic component 1 functions as a common-mode choke coil. The electronic component 1 efficiently transmits a differential signal in a normal mode, and eliminates invading noise in a common mode.

When the distance between the outer electrodes 7-1 and 7-3 (7-2 and 7-4) is short, as tray capacitance is produced therebetween. However, in the electronic component 1 of this embodiment, the dielectric layers 8 are interposed between the outer electrodes 7-1 (7-2 to 7-4) and the magnetic substrates 5 and 6, and an air space lies between the outer electrodes 7-1 and 7-3 (7-2 and 7-4), as described above. Therefore, as shown in FIG. 9, as tray capacitance is not produced in a gap B between the outer electrodes 7-1 and 7-3 (7-2 and 7-4). A stray capacitance C is produced in a portion of the magnetic substrate 5 (6) having a high dielectric constant between the outer electrodes 7-1 and 7-3 (7-2 and 7-4), as shown by broken lines in FIG. 9. However, since the dielectric layers 8 having a low dielectric constant of 3.2 are interposed between the outer electrodes 7-1 and 7-3 (7-2 and 7-4) and the magnetic substrate 5 (6), and the outer electrodes 7-1 and 7-3 (7-2 and 7-4) do not protrude from the dielectric layers 8, an electric field for producing the stray capacitance inevitably passes through the dielectric layers 8, and is reduced by the dielectric layers 8. As a result, the stray capacitance C produced between the adjacent outer electrodes 7-1 and 7-3 (7-2 and 7-4) is reduced, and the decrease in the characteristic impedance near the outer electrodes 7-1 and 7-3 (7-2 and 7-4) is suppressed.

In order to verify this effect of suppressing the decrease in the characteristic impedance, the present inventors took measurement to compare the characteristic impedance of a conventional common-mode choke coil having no dielectric layer with the characteristic impedance of the common-mode choke coil according to this embodiment.

Figure 10:
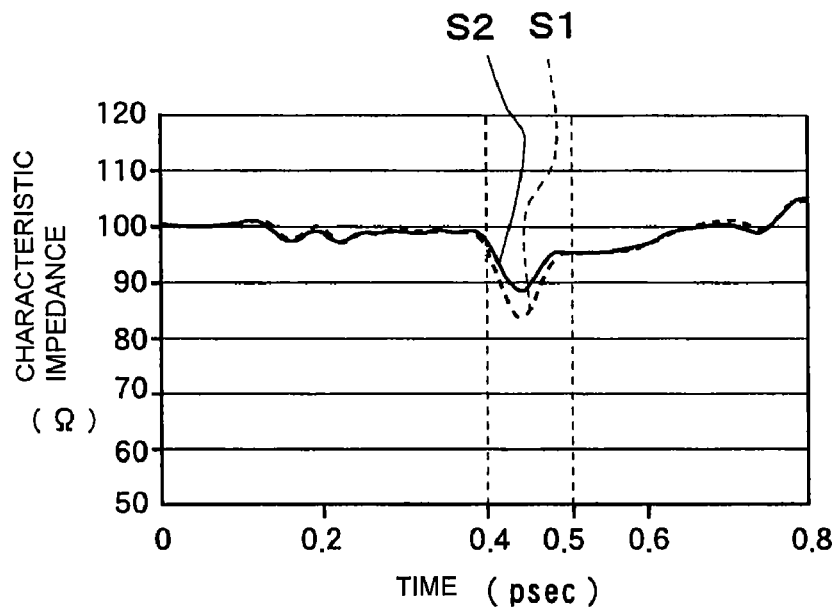
FIG. 10 is a diagram showing the characteristic impedance of a conventional common-mode choke coil having no dielectric layer and the characteristic impedance of a common-mode choke coil according to this embodiment.

FIG. 10 is a diagram showing the characteristic impedance of a conventional common-mode choke coil having no dielectric layer and the characteristic impedance of the common-mode choke coil according to this embodiment.

In this case, the common-mode choke coils were mounted on a transmission line having a characteristic impedance of 100 Ω, and characteristic impedances at the positions were measured by TDR (Time Domain Reflectometry).

In FIG. 9, a curved line S1 shown by a broken line represents the characteristic impedance of the conventional common-mode choke coil having no dielectric layer, and a curved line S2 shown by a solid line represents the characteristic impedance of the common-mode choke coil according to this embodiment. As shown in FIG. 9, the positional range of 0.4 to 0.5 (psec) represents the adjacencies of the outer electrodes 7-1 to 7-4, and the characteristic impedances shown by both the curved lines S1 and S2 are reduced there at. However, while the characteristic impedance is reduced to 84 Ω in this range in the conventional common-mode choke coil, as shown by the curved line S1, the characteristic impedance is reduced only to 88 Ω in the common-mode choke coil of this embodiment. This shows that matching with the transmission line is possible.

Second Embodiment

A second embodiment of the present invention will now be described.

Figure 11:
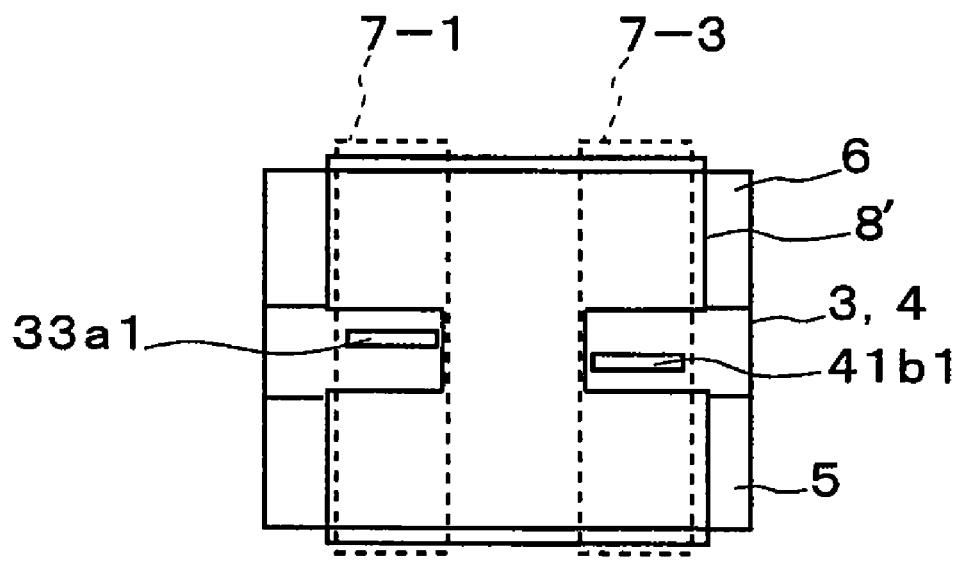
FIG. 11 is a front view of an electronic component according to a second embodiment of the present invention.
Figure 12:
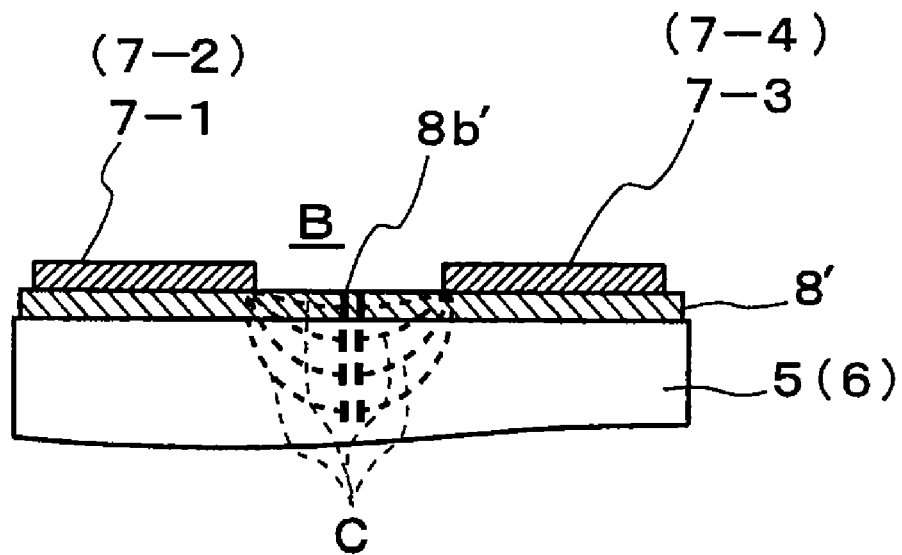
FIG. 12 is a schematic partial sectional view explaining the operation and advantages of the second embodiment.

FIG. 11 is a front view of an electronic component according to a second embodiment of the present invention, and FIG. 12 is a schematic partial sectional view explaining the operation and advantages of the second embodiment.

The electronic component according to this embodiment is different from the above-described first embodiment in that the characteristic impedance is reduced near the outer electrodes 7-1 to 7-4.

More specifically, as shown in FIG. 11, a single dielectric layer 8' that is not split is formed over the adjacent outer electrodes 7-1 and 7-3 (7-2 and 7-4). That is, the single dielectric layer 8' is provided under the outer electrodes 7-1 and 7-3 (7-2 and 7-4) so as not to cover leading ends 33a1 (33c1) and 41b1 (41a1) of coil patterns 33 and 41, so that the dielectric layer 8' also lies between the adjacent outer electrodes 7-1 and 7-3 (7-2 and 7-4). The dielectric constant of the dielectric layer 8' is set to be greater than or equal to the dielectric constant of magnetic substrates 5 and 6.

As described above, in this embodiment, the dielectric layer 8' lies between the outer electrodes 7-1 (7-2 to 7-4) and the magnetic substrates 5 and 6, and the dielectric layer 8' also lies between the outer electrodes 7-1 and 7-3 (7-2 and 7-4). Since the dielectric layer 8' also lies in a gap B between the outer electrodes 7-1 and 7-3 (7-2 and 7-4), as shown in FIG. 12, a stray capacitance is also produced therebetween. For this reason, the stray capacitance C is produced not only in the magnetic substrate 5 (6), but also in the dielectric layer 8', as shown by broken lines. Moreover, since the dielectric constant of the dielectric layer 8' is set to be greater than or equal to 10 to 15, the quite large stray capacitance C is produced between the adjacent outer electrodes 7-1 and 7-3 (7-2 and 7-4), and the characteristic impedance near the outer electrodes 7-1 and 7-3 (7-2 and 7-4) is reduced considerably.

Other structures, operation, and advantages are similar to those in the above-described first embodiment, and therefore, descriptions thereof are omitted.

The present invention is not limited to the above-described embodiments, and various modifications and alterations are possible within the scope of the present invention.

For example, while the magnetic substrates 5 and 6 are adopted as the substrate elements in the above embodiments, dielectric substrates or insulating substrates can be adopted as the substrate elements.

While a pair of grooves 9 and 9 are formed in each of the magnetic substrates 5 and 6 in the second step of the production method in the above embodiment, one groove 9 may be formed in only one of the magnetic substrates 5 and 6.

Figure 13:
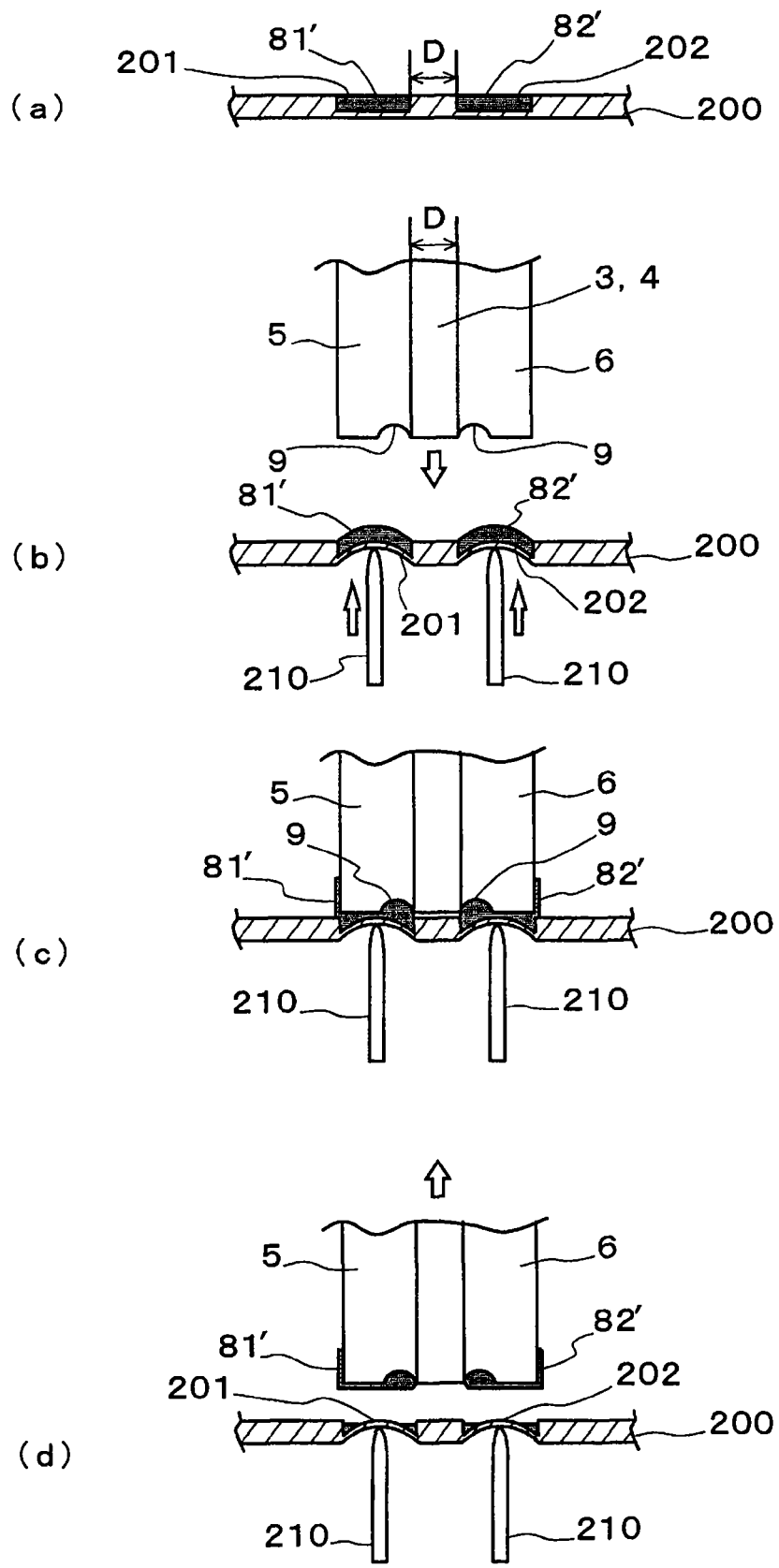
FIG. 13 includes process views showing a modification of a third step in a production method.
Figure 14:
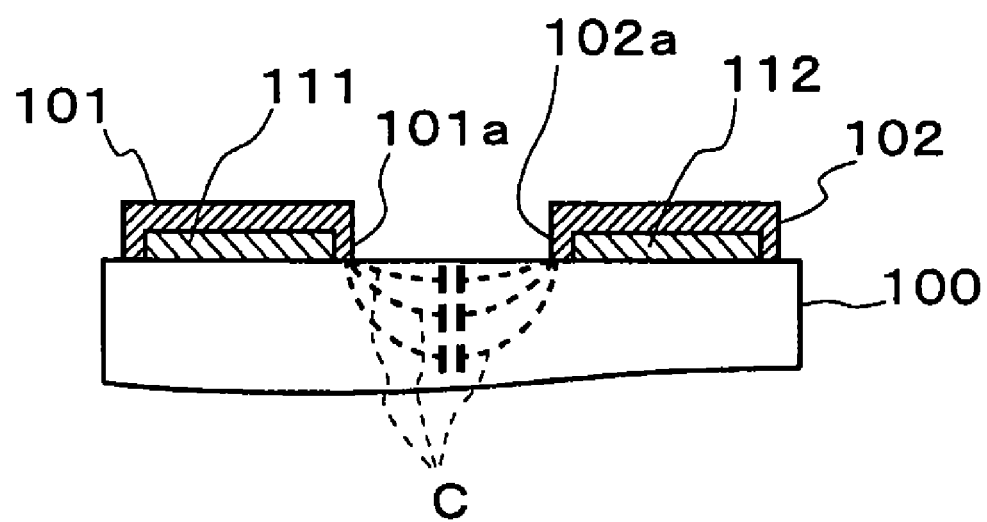
FIG. 14 is a schematic partial sectional view explaining a problem of the conventional art.

While the dielectric paste is applied onto the chip body 2 from top to bottom, for example, by rolling or screen printing in the third step of the production method in the above embodiment, the dielectric paste can be applied onto the chip body 2 by partial dipping. That is, as shown in FIG. 13(*a*), a mask 200 is placed in a manner such that recesses 201 and 202, which are spaced by a distance D substantially equal to the distance between the magnetic substrates 5 and 6 of the chip body 2, faces upward, and dielectric pastes 81' and 82' are stored in the recesses 201 and 202, respectively. Then, as shown in FIG. 13(*b*), thin bottoms of the recesses 201 and 201 are pushed up by pins 210 and 210 so as to raise the dielectric pastes 81' and 82'. In this state, the chip body 2 is lowered toward the surfaces of the raised dielectric pastes 81' and 82'. At the time when the chip body 2 touches the surfaces of the dielectric pastes 81' and 82', as shown in FIG. 13(*c*), it is pressed against the surfaces of the dielectric pastes 81' and 85', so that the dielectric pastes 81' and 82' adhere onto end faces of the magnetic substrates 5 and 6. Subsequently, as shown in FIG. 13(*d*), when the chip body 2 is pulled up, the dielectric pastes 81' and 82' adhering to the magnetic substrates 5 and 6 are drawn into the grooves 9 of the chip body 2 by surface tension thereof. As a result, the dielectric pastes 81' and 82 are partially dipped only at desired positions on the magnetic substrates 5 and 6 without covering the leading ends 33a1 (33c1) and 41b1 (41a1) of the coil patterns 33 and 41.

The invention claimed is:

1. An electronic component comprising:
    a chip body including a circuit block sandwiched between a pair of substrate elements, the circuit block including a circuit pattern having end portions thereof exposed from the circuit block;
    a plurality of outer electrodes extending from a first surface of one of the substrate elements to a second surface of the other substrate element, each outer electrode being connected to at least one of the exposed end portions of the circuit pattern; and a dielectric layer interposed between the outer electrodes and the chip body and not in contact with the exposed end portions of the circuit pattern, wherein a width of the dielectric layer is greater than or equal to a width of each of the outer electrodes, and wherein at least one groove is provided on at least one of the first and second surfaces of the substrate elements proximal to at least one of the exposed end portions of the circuit pattern, and a length of the at least one groove is greater than or equal to a width of the exposed end portion.

2. The electronic component according to claim 1, wherein a dielectric constant of the dielectric layer is lower than a dielectric constant of the substrate elements.

3. The electronic component according to claim 1, wherein a dielectric constant of the dielectric layer is greater than or equal to a dielectric constant of the substrate elements.

4. The electronic component according to claim 1, wherein the electronic component is a common-mode choke coil, the circuit block includes first and second coil blocks stacked together, the first and second coil blocks each respectively having coil patterns as the circuit pattern;

the pair of substrate elements are a pair of magnetic substrates; and the plurality of outer electrodes includes:

first and second outer electrodes connected to respective end portions of the coil pattern provided in the first coil block; and third and fourth outer electrodes connected to respective end portions of the coil pattern provided in the second coil block.

5. An electronic-component production method for producing the electronic component according to claim 1, the electronic-component production method comprising:

forming the chip body;

forming the at least one groove;

of forming the dielectric layer by applying a dielectric paste having a predetermined viscosity on at least the first and second surfaces of the substrate elements; and forming the outer electrodes on the dielectric layer.

6. The electronic component according to claim 1, wherein the plurality of outer electrodes are substantially angular U-shaped outer electrodes that extend from an upper surface to a lower surface of the electronic component.

7. The electronic component according to claim 1, wherein at least a portion of the dielectric layer is within the at least one groove.

8. The electronic component according to claim 2, wherein the dielectric layer is split so as to form a space between adjacent outer electrodes.

9. The electronic component according to claim 3, wherein a portion of the dielectric layer lies between adjacent outer electrodes.

10. The electronic-component production method according to claim 5, wherein the width of the at least one groove is ½ to ⅓ times a thickness of the substrate element on which the groove is provided.

11. The electronic-component production method according to claim 5, wherein a pair of grooves are formed so that the exposed end portions of the circuit pattern are provided therebetween.

* * * * *